US012803681B2

(12) United States Patent
Chen et al.

(10) Patent No.: US 12,803,681 B2
(45) Date of Patent: Nov. 17, 2026

(54) METHOD FOR GENERATING POWER-COMPENSATION VALUES WITH HISTORICAL DATA ASSOCIATION AND WIRELESS COMMUNICATION MODULE

(71) Applicant: AZUREWAVE TECHNOLOGIES, INC., New Taipei City (TW)

(72) Inventors: Wu-Yi Chen, New Taipei City (TW); Ting-Heng Han, New Taipei City (TW); Hsin-Yin Hu, New Taipei City (TW); Wei-Chia Hung, New Taipei City (TW); Yu-Tian Wei, Shanghai (CN); Chun-Hao Lin, New Taipei City (TW)

(73) Assignee: AZUREWAVE TECHNOLOGIES, INC., New Taipei City (TW)

( * ) Notice: Subject to any disclaimer, the term of this patent is extended or adjusted under 35 U.S.C. 154(b) by 171 days.

(21) Appl. No.: 19/014,365

(22) Filed: Jan. 9, 2025

(65) Prior Publication Data

US 2026/0142733 A1 May 21, 2026

(30) Foreign Application Priority Data

Nov. 19, 2024 (TW) ................................ 113144351

(51) Int. Cl.
*H04B 17/373* (2015.01)
*H04B 17/10* (2015.01)
*H04B 17/13* (2015.01)

(52) U.S. Cl.
CPC ........... *H04B 17/102* (2015.01); *H04B 17/13* (2015.01); *H04B 17/373* (2015.01)

(58) Field of Classification Search
CPC .... H04B 17/10; H04B 17/101; H04B 17/102; H04B 17/13; H04B 17/15; H04B 17/373;
(Continued)

(56) References Cited

U.S. PATENT DOCUMENTS 8,364,104 B2 * 1/2013 Cohen .................... H04B 17/13
455/127.1
2020/0021370 A1 1/2020 Huynh et al.
(Continued)

*Primary Examiner* — Quochien B Vuong
(74) *Attorney, Agent, or Firm* — Li & Cai Intellectual Property (USA) Office

(57) ABSTRACT

A method for generating power-compensation values with historical data association and a wireless communication module are provided. In the method, historical data of associations among the power-compensation values for multiple frequencies that the wireless communication module operates on are obtained. Summations of multiple values of associations among the power-compensation values in multiple frequencies are calculated, and a largest summation of the values of associations is used to decide a critical frequency. The multiple values of associations between the power-compensation value of the critical frequency and the power-compensation values of the multiple frequencies form a dataset. The power-compensation values appropriate to the multiple frequencies can be estimated based on the power-compensation value of the critical frequency with reference to the values of associations among the multiple frequencies. A power-compensation list written into a memory is formed.

15 Claims, 13 Drawing Sheets

(58) Field of Classification Search
CPC ... H04W 52/18; H04W 52/22; H04W 52/225; H04W 52/228
See application file for complete search history.

(56) References Cited

U.S. PATENT DOCUMENTS

| | | | | |
|---|---|---|---|---|
| 2022/0321063 | A1 | 10/2022 | Song | |
| 2023/0021166 | A1* | 1/2023 | Rajput | H04B 17/13 |
| 2023/0253994 | A1* | 8/2023 | Kao | H04B 17/14 375/296 |
| 2024/0171291 | A1 | 5/2024 | Yang et al. | |
| 2025/0202511 | A1* | 6/2025 | Noh | H04B 1/04 |

* cited by examiner 21 200 22 201

| | -6 | -5 | -4 | -3 | -2 | -1 | 0 | 1 | 2 | 3 |
|---|---|---|---|---|---|---|---|---|---|---|
| -4 | | 23 | 15 | | | | | | | |
| -3 | 2 | 28 | 644 | 356 | 3 | 1 | | | | |
| -2 | 3 | 76 | 645 | 4992 | 1525 | 4 | 1 | | | |
| -1 | | 13 | 755 | 3711 | 14947 | 3131 | 18 | 2 | | |
| 0 | | | 84 | 2464 | 11043 | 28107 | 1955 | 30 | 2 | |
| 1 | | | | 187 | 3815 | 22758 | 35514 | 3561 | 42 | 1 |
| 2 | | | | | 176 | 4498 | 31187 | 29989 | 2776 | 18 |
| 3 | | | | | | 88 | 4866 | 25139 | 14746 | 1329 |
| 4 | | | | | | 3 | 46 | 3102 | 10083 | 3754 |
| 5 | | | | | | | | 17 | 878 | 1950 |
| 6 | | | | | | | | 2 | 10 | 115 |

FIG. 2

50

| | f1 | f2 | f3 | f4 | f5 | f6 | • • • | fN-1 | fN |
|---|---|---|---|---|---|---|---|---|---|
| f1 | 1.00 | 0.94 | 0.92 | 0.94 | 0.91 | 0.91 | • • • | 0.92 | 0.86 |
| f2 | 0.94 | 1.00 | 0.93 | 0.90 | 0.89 | 0.91 | • • • | 0.91 | 0.86 |
| f3 | 0.92 | 0.93 | 1.00 | 0.95 | 0.93 | 0.93 | • • • | 0.95 | 0.89 |
| • • • | • • • | • • • | • • • | • • • | • • • | • • • | • • • | • • • | • • • |
| f10 | 0.87 | 0.84 | 0.90 | 0.91 | 0.90 | 0.92 | • • • | 0.91 | 0.86 |
| f11 | 0.89 | 0.85 | 0.89 | 0.90 | 0.89 | 0.91 | • • • | 0.91 | 0.86 |
| • • • | • • • | • • • | • • • | • • • | • • • | • • • | • • • | • • • | • • • |
| fN-1 | 0.92 | 0.91 | 0.95 | 0.94 | 0.95 | 0.95 | • • • | 1.00 | 0.93 |
| fN | 0.86 | 0.86 | 0.89 | 0.88 | 0.90 | 0.90 | • • • | 0.93 | 1.00 |

FIG. 5

60

601

| | f1 | f2 | f3 | f4 | f5 | f6 | • • • | fN-1 | fN | summation |
|---|---|---|---|---|---|---|---|---|---|---|
| f1 | 1.00 | 0.94 | 0.92 | 0.94 | 0.91 | 0.91 | • • • | 0.92 | 0.86 | 18.05 |
| f2 | 0.94 | 1.00 | 0.93 | 0.90 | 0.89 | 0.91 | • • • | 0.91 | 0.86 | 17.86 |
| f3 | 0.92 | 0.93 | 1.00 | 0.95 | 0.93 | 0.93 | • • • | 0.95 | 0.89 | 18.41 |
| • • • | • • • | • • • | • • • | • • • | • • • | • • • | • • • | • • • | • • • | • • • |
| f10 | 0.87 | 0.84 | 0.90 | 0.91 | 0.90 | 0.92 | • • • | 0.91 | 0.86 | 17.93 |
| f11 | 0.89 | 0.85 | 0.89 | 0.90 | 0.89 | 0.91 | • • • | 0.91 | 0.86 | 18.00 |
| • • • | • • • | • • • | • • • | • • • | • • • | • • • | • • • | • • • | • • • | • • • |
| fN-1 | 0.92 | 0.91 | 0.95 | 0.94 | 0.95 | 0.95 | • • • | 1.00 | 0.93 | 18.73 |
| fN | 0.86 | 0.86 | 0.89 | 0.88 | 0.90 | 0.90 | • • • | 0.93 | 1.00 | 17.94 |

FIG. 6

70

601

| | f1 | f2 | f3 | f4 | f5 | f6 | ... | fN-1 | fN | summation |
|---|---|---|---|---|---|---|---|---|---|---|
| f1 | 1.00 | 0.94 | 0.92 | 0.94 | 0.91 | 0.91 | ... | 0.92 | 0.86 | 18.05 |
| f2 | 0.94 | 1.00 | 0.93 | 0.90 | 0.89 | 0.91 | ... | 0.91 | 0.86 | 17.86 |
| f3 | 0.92 | 0.93 | 1.00 | 0.95 | 0.93 | 0.93 | ... | 0.95 | 0.89 | 18.41 |
| ... | ... | ... | ... | ... | ... | ... | ... | ... | ... | ... |
| f10 | 0.87 | 0.84 | 0.90 | 0.91 | 0.90 | 0.92 | ... | 0.91 | 0.86 | 17.93 |
| f11 | 0.89 | 0.85 | 0.89 | 0.90 | 0.89 | 0.91 | ... | 0.91 | 0.86 | 18.00 |
| ... | ... | ... | ... | ... | ... | ... | ... | ... | ... | ... |
| fN-1 | 0.92 | 0.91 | 0.95 | 0.94 | 0.95 | 0.95 | ... | 1.00 | 0.93 | 18.73 |
| fN | 0.86 | 0.86 | 0.89 | 0.88 | 0.90 | 0.90 | ... | 0.93 | 1.00 | 17.94 |
| ... | ... | ... | ... | ... | ... | ... | ... | ... | ... | ... |
| pre-selection set | | | | | | | | | | |
| fN-1 | 0.92 | 0.91 | 0.95 | 0.94 | 0.95 | 0.95 | ... | 1.00 | 0.93 | 18.73 |

701

703

705

FIG. 7

90

905

| | | f2 | f10 | f11 | f13 | sum |
|---|---|---|---|---|---|---|
| | f1 | 0.94 | 0.87 | 0.89 | 0.79 | 3.49 |
| | f2 | 1.00 | 0.84 | 0.86 | 0.75 | 3.45 |
| | f3 | 0.93 | 0.90 | 0.89 | 0.84 | 3.55 |
| | • • • | • • • | • • • | • • • | • • • | • • • |
| | f10 | 0.84 | 1.00 | 0.90 | 0.92 | 3.73 |
| | f11 | 0.86 | 0.97 | 1.00 | 0.90 | 3.72 |
| | • • • | • • • | • • • | • • • | • • • | • • • |
| | fN-1 | 0.91 | 0.91 | 0.91 | 0.89 | 3.63 |
| | fN | 0.86 | 0.86 | 0.86 | 0.96 | 3.45 |
| | • • • | • • • | • • • | • • • | • • • | • • • |
| | pre-selection set | | | | | |
| 701' | fN-1 | 0.91 | 0.91 | 0.91 | 0.89 | |
| 901 | f10 | 0.84 | 1.00 | 0.97 | 0.92 | |
| 903 | pre-selection maximum correlation coefficient | 0.91 | 1.00 | 0.97 | 0.92 | |

FIG. 9

11

| | | f2 |
|---|---|---|
| | f1 | 0.94 |
| | f2 | 1.00 |
| | f3 | 0.93 |
| | • • • | • • • |
| | f10 | 0.84 |
| | f11 | 0.86 |
| | • • • | • • • |
| | fN-1 | 0.91 |
| | fN | 0.86 |
| | • • • | • • • |
| | pre-selection set | |
| 701” | fN-1 | 0.91 |
| 901’ | f10 | 0.84 |
| 111 | f2 | 1.00 |
| 113 | pre-selection maximum correlation coefficient | 1.00 |

FIG. 10

12

| | f1 | f2 | f3 | f4 | f5 | f6 | • • • | fN-1 | fN |
|---|---|---|---|---|---|---|---|---|---|
| f1 | 1.00 | 0.94 | 0.92 | 0.94 | 0.91 | 0.91 | • • • | 0.92 | 0.86 |
| f2 | 0.94 | 1.00 | 0.93 | 0.90 | 0.89 | 0.91 | • • • | 0.91 | 0.86 |
| f3 | 0.92 | 0.93 | 1.00 | 0.95 | 0.93 | 0.93 | • • • | 0.95 | 0.89 |
| • • • | • • • | • • • | • • • | • • • | • • • | • • • | • • • | • • • | • • • |
| f10 | 0.87 | 0.84 | 0.90 | 0.91 | 0.90 | 0.92 | • • • | 0.91 | 0.86 |
| f11 | 0.89 | 0.85 | 0.89 | 0.90 | 0.89 | 0.91 | • • • | 0.91 | 0.86 |
| • • • | • • • | • • • | • • • | • • • | • • • | • • • | • • • | • • • | • • • |
| fN-1 | 0.92 | 0.91 | 0.95 | 0.94 | 0.95 | 0.95 | • • • | 1.00 | 0.93 |
| fN | 0.86 | 0.86 | 0.89 | 0.88 | 0.90 | 0.90 | • • • | 0.93 | 1.00 |
| • • • | • • • | • • • | • • • | • • • | • • • | • • • | • • • | • • • | • • • |
| pre-selection set | | | | | | | | | |
| first critical frequency (fN-1) | 0.92 | 0.91 | 0.95 | 0.94 | 0.95 | 0.95 | • • • | 1.00 | 0.93 |
| second critical frequency (f10) | 0.87 | 0.84 | 0.90 | 0.91 | 0.90 | 0.92 | • • • | 0.91 | 0.86 |
| third critical frequency (f2) | 0.94 | 1.00 | 0.93 | 0.90 | 0.89 | 0.91 | • • • | 0.91 | 0.86 |
| pre-selection maximum correlation coefficient | 0.94 | 1.00 | 0.95 | 0.94 | 0.95 | 0.95 | • • • | 1.00 | 1.00 |

123 (f2 row), 122 (f10 row), 121 (fN-1 row), 125 (pre-selection maximum correlation coefficient row)

FIG. 11

METHOD FOR GENERATING POWER-COMPENSATION VALUES WITH HISTORICAL DATA ASSOCIATION AND WIRELESS COMMUNICATION MODULE

CROSS-REFERENCE TO RELATED PATENT APPLICATION

This application claims the benefit of priority to Taiwan Patent Application No. 113144351, filed on Nov. 19, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a technology of power compensation applied to a wireless communication module, and more particularly to a power compensation method for estimating compensation power using historical data association and a wireless communication module thereof.

BACKGROUND OF THE DISCLOSURE

When a wireless communication module is manufactured, the transmit power of the wireless communication module is required to be compensated and checked so as to pass factory verification. FIG. 1 is a schematic diagram illustrating a test system for the wireless communication module. In the test system, a test instrument 10 is used to generate test data 101, such as the WiFi™ or Bluetooth™ communication signals. The signals are transmitted out via a wireless communication module 100. After that, the measure power 103 of the wireless communication module 100 under multiple frequency bands is measured. The measure power 103 can be compared with the target power for obtaining power-compensation values, i.e., the compensated power is equal to a subtracting the measure power 103 from the target power. The power-compensation values in the multiple frequency bands are then written to a memory 110 of the wireless communication module 100.

The memory 110 of the wireless communication module 100 can be a one-time programmable (OTP) memory such as an electrically-erasable programmable read-only memory (EEPROM) or an EFuse. When the power-compensation values are successfully written into the memory 110, the wireless communication module 100 can be shipped from the factory and used in various electronic devices.

The conventional method for calculating the compensation power for the wireless communication module is required to test and verify each of the channels; however, the verification may fail if the calculated compensation power fails to meet a specification, which means that the power-compensation values are wrong. Thus, the whole processes such as adjustment, measurement, test and calculation need to be executed again, and a verification schedule for the wireless communication module will be postponed.

SUMMARY OF THE DISCLOSURE

In order to reduce verification time by more efficiently acquiring power-compensation values for a wireless communication module, provided in the present disclosure is a method for generating power-compensation values with historical data association, and a wireless communication module that applies the power-compensation values obtained by the method.

In an aspect of the present disclosure, main circuit components of the wireless communication module include a wireless communication circuit and a memory. The memory stores a set of power-compensation values for the wireless communication module and which are obtained from the historical data in multiple frequencies. In the method for generating power-compensation values with historical data association, the association values among the power-compensation values operated in the wireless communication module in multiple frequencies are firstly obtained, and then a sum of the multiple association values among the power-compensation values is calculated. A first sum of the multiple association values with respect to the multiple frequencies is therefore obtained. Afterwards, a maximum of multiple first sums can be obtained, and the maximum is referred to for obtaining a first critical frequency. Further, multiple association values between the power-compensation values in the first critical frequency and the power-compensation values in the multiple frequencies form a first pre-selection set. Accordingly, the power-compensation values in the first critical frequency with reference to the association values among the power-compensation values in the multiple frequencies in the first pre-selection set are referred to for estimating the power-compensation values for the wireless communication module in the multiple frequencies. These estimated power-compensation values form a power-compensation list to be written to a memory.

An association indicator, such as a correlation coefficient, is used to indicate the association. In one aspect, the wireless communication module undergoes testing by the test platform. When the transmit power under various configuration settings of antenna-datarate-frequency (ARF) of the wireless communication module is measured, the measured transmit power is compared with target values corresponding to the various configuration settings of ARF so as to obtain multiple power-compensation values. The power-compensation values form the historical data applicable to the method for generating power-compensation values with historical data association of the present disclosure. A correlation coefficient formula is then used to calculate correlation coefficients between the power-compensation values in each of the frequencies and the power-compensation values in other frequencies. Therefore, the correlation coefficients become a basis to estimate the power-compensation values for the wireless communication module in multiple frequencies.

Further, for one or more association values lower than a target value in the first pre-selection set, one or more second sums of the association values between the one or more power-compensation values corresponding to one or more frequencies and the power-compensation values of the multiple frequencies is calculated, and a maximum of the one or more second sums is obtained so as to obtain a second critical frequency correspondingly.

After that, the association values among the power-compensation values in the one or more frequencies corresponding to one or more association values that do not meet the target value in the first pre-selection set and the second critical frequency form a second pre-selection set. Further, the power-compensation values adapted to all frequencies are estimated according to the power-compensation values in the first critical frequency and the second critical frequency and with reference to the association values in the first pre-selection set and the second pre-selection set.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 2 is an exemplary example showing a power-compensation indicator relationship table for the wireless communication module in different frequencies;

FIG. 5 is an exemplary example of a relationship table of correlation coefficients among the power-compensation values for the wireless communication module in multiple frequencies;

FIG. 6 is another exemplary example of a relationship table that is used to evaluate power-compensation indicator associations for the wireless communication module in multiple frequencies;

FIG. 7 is yet another exemplary example of a relationship table that is used to evaluate power-compensation indicator associations for the wireless communication module in multiple frequencies;

FIG. 9 is an exemplary example of a reduced relationship table used to evaluate associations for the wireless communication module in multiple frequencies;

FIG. 10 is an exemplary example of a second reduced relationship table used to evaluate associations for the wireless communication module in multiple frequencies;

FIG. 11 is an exemplary example of a relationship table recording associations between power-compensation values for the wireless communication module in multiple critical frequencies and power-compensation values in all of the frequencies;

DETAILED DESCRIPTION OF THE EXEMPLARY EMBODIMENTS

Figure 1:
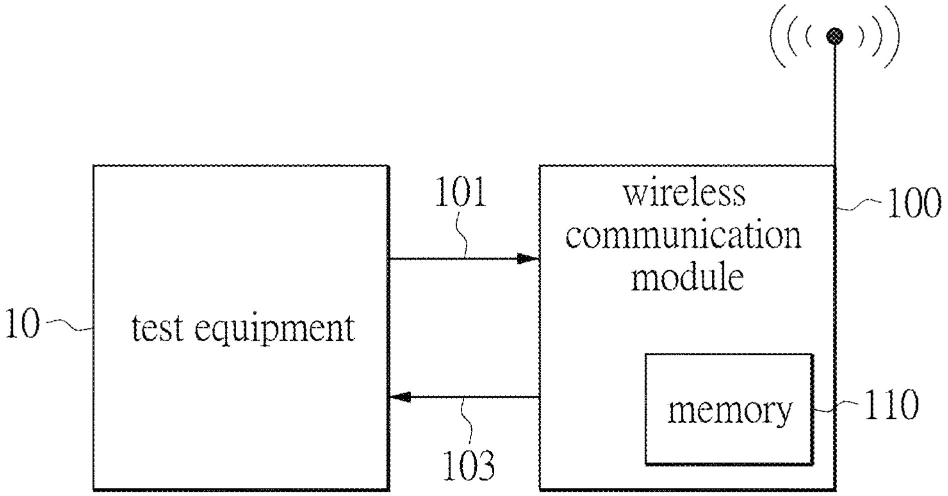
FIG. 1 RELATED ART
FIG. 1 is a schematic diagram illustrating test system for a wireless communication module in one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

The present disclosure relates to a method for generating power-compensation values with historical data association and a wireless communication module. One of the main objectives of the method is to estimate a power-compensation value actually applied to the wireless communication module (or an inside wireless communication circuit) in each of channels based on features of the historical data that are generated by measuring transmit power of the wireless communication modules in a same manufacturing project. Furthermore, the associations of the wireless communication modules that are in the same project can be used to obtain the power-compensation values more efficiently. The power-compensation values can be transformed to the specific power-compensation indexes so as to be written to the memory of each of the wireless communication modules. Therefore, the above-described concept of the present disclosure can effectively reduce the time to calibrate the wireless communication module or a similar product.

According to certain embodiments of the method for generating power-compensation values with historical data association of the present disclosure, any of the wireless communication modules can be equipped with a plurality of antennas that can be used to operate different data rates in different channels. After the transmit power under various configuration settings of antenna-datarate-frequency (ARF) can be measured, it is acknowledged that the wireless communication modules (or the inside wireless communication circuits) in the same project have similar data features since they are manufactured by a same manufacturing process at a similar time. This means the compensation values of ARF for the products in the same project that are manufactured at a similar time have associations. Thus, in the method for generating power-compensation values with historical data association, the historical data that is formed by the power-compensation values applied to the multiple wireless communication modules to be measured under various configuration settings of ARF is used to estimate the associations among the multiple power-compensation values under the configuration settings of ARF. A target value of association value that is a type of statistical quantity is referred to selecting multiple configuration settings of ARF for obtaining corresponding critical power-compensation values. The power-compensation values are configured to be a power-compensation list to be written to the memory of the wireless communication module. One of the objectives of the method is, when the wireless communication module is in operation, to use the power-compensation values in part of the frequencies to estimate the power-compensation values in other frequencies with different transmission parameters based on the above-described associations according to the power-compensation list.

It should be noted that the concept of the method for generating power-compensation values with historical data association is to use the historical data of the power-compensation values applied to the wireless communication modules or the inside communication circuits that are manufactured in various batches to obtain associations among the power-compensation values in different frequencies. The associations are determined based on various statistical quantities of the wireless communication modules in different frequencies. The statistical quantities can be, but are not limited to, correlation coefficients, statistical quantity of cumulative distribution, statistical quantity of non-defective distribution, or statistical quantity of first pass yield. It should be noted that, referring to FIG. 2, the non-defective distribution indicates a yield of one single measurement item of the wireless communication modules under different configuration settings of ARF, and the statistical quantity of the first pass yield indicates a combined statistical quantity for the wireless communication module that pass all test items at a first time.

Based on the concept that the wireless communication modules or the inside wireless communication circuits that are manufactured in the same project that have the same manufacturing process at a similar time have the similar data features, the power-compensation values in part of the frequencies recorded in the power-compensation list stored in the memory of the wireless communication module can be referred to for estimating the power-compensation values in other frequencies. Reference is made to FIG. 2, which is an exemplary example of a relationship table showing the power-compensation indexes applied to the wireless communication modules in different frequencies in the same manufacturing project.

FIG. 2 shows a statistical data relating to the power-compensation indexes in different frequencies applied to the wireless communication modules that are manufactured in the same project or with a similar manufacturing process. In the diagram, the power-compensation indexes of "−6, −5, −4 to 3" labeled in a horizontal direction of the table are with respect to a first frequency 21, and the power-compensation indexes of "−4, −3, −2 to 6" in the vertical direction of the table are with respect to a second frequency 22. The values shown in the table indicate the product quantities in each of the power-compensation indexes of the first frequency 21 corresponding to each of the power-compensation indexes of the second frequency 22. The top three largest values in each of the power-compensation indexes of the first frequency 21 are selected and then the maximum is specified to correspond to the power-compensation index for the second frequency 22.

For example, taking the power-compensation index of "−1" of the first frequency 21 as an example, the table shows the multiple product quantities 200, and critical product quantities 201 with the larger numbers are selected therefrom. Based on this historical data, there are 28,107 products with the power-compensation index of "−1" in the first frequency 21 corresponding to the power-compensation index of "0" in the second frequency 22, and there are 22,758 products with the power-compensation index of "−1" in the first frequency 21 corresponding to the power-compensation index of "+1" in the second frequency 22. Thus, in the method for generating power-compensation values with historical data association, the critical power-compensation indexes (or the power-compensation values with the maximum statistical quantity) in part of the frequencies of the historical statistical data of FIG. 2 is referred to, based on a premise that the transmission data of the wireless communication modules in the same manufacturing project have a high association, for estimating the power-compensation indexes or the power-compensation values in other frequencies.

Figure 3:
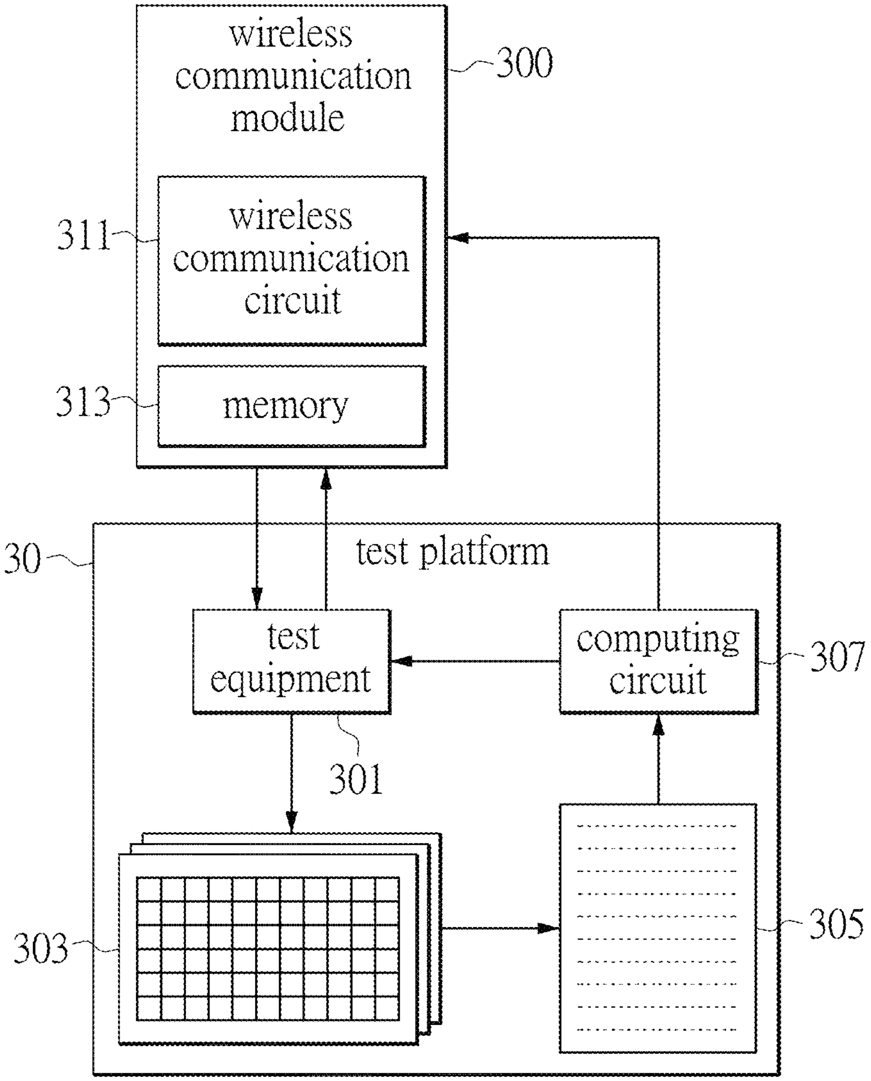
FIG. 3 is a schematic diagram illustrating a test framework for measuring transmit power of the wireless communication module so as to generate historical data in one embodiment of the present disclosure.

Reference is made to FIG. 3, which is a schematic diagram illustrating a test framework for measuring transmit power to generate historical data in one embodiment of the present disclosure. In particular, the historical data can be used to obtain the power-compensation values individually corresponding to multiple frequencies of a wireless communication module 300.

The test framework provides a test platform 30 that can be implemented by a computer system that conducts computations and storage. The test platform 30 includes a test instrument 301 that connects with a wireless communication module 300 to be tested via a connection interface. Main circuit components of the wireless communication module 300 include a wireless communication circuit 311 having a transmit circuit (TX), a receive circuit (RX) and a memory 313. The wireless communication circuit 311 that is an integrated circuit used to perform a specific wireless communication protocol, signal encoding and decoding, and transmit/receive in the wireless communication module 300. The memory 313 is electrically connected with the wireless communication circuit 311. The memory 313 is used to store the power-compensation values for the wireless communication module 300 in multiple frequencies, and these power-compensation values are obtained based on the historical data.

When the wireless communication module 300 is under test, the test instrument 301 generates test data with the specific power and inputs the test data to the wireless communication module 300. The wireless communication module 300 connects with an external device (not shown in the diagram). The wireless communication circuit 311 is controlled to transmit radio-frequency signals with the transmit power via an antenna. Then the test instrument 301 measures the transmit power of the radio-frequency signals to be outputted under different configuration settings of ARF via different channels by the wireless communication module 300 so as to obtain multiple measured data.

Afterwards, a computation circuit 307 of the test platform 30 compares the measured data of the transmit power being obtained under different configuration settings of ARF and the target values corresponding to the different configuration settings of ARF, and obtains multiple power-compensation values. The power-compensation values can be expressed by compensation indexes. The compensation indexes for the multiple wireless communication modules in the same manufacturing project can be computed and used to establish historical data 303. The historical data 303 can be stored in a storage device (not shown in the diagram) of the test platform 30.

According to one of the embodiments of the present disclosure, the test instrument 301 obtains measured values by measuring the transmit power of the wireless communication module 300 and obtains differences by comparing the measured values and the target values. The differences are referred to for obtaining compensation values. The compensation values are used to calibrate the transmit power of the wireless communication module 300.

Based on specifications provided by different manufacturers for the wireless communication circuits and a purpose of writing the power-compensation values to the memory 313 of the wireless communication module 300, a transformation formula is provided to calculate the compensation indexes. Therefore, the compensation values can be transformed to the compensation indexes based on the setting of the manufacturers. When the wireless communication module 300 is in operation of power compensation, the wireless communication circuit 311 can calculate a power-compensation value that is actually operated in the wireless communication module 300 for compensating the transmit power. Table 1 shows an exemplary example of the compensation indexes. Table 1 shows that a measured value is 16 dBm when actually measuring the wireless communication module 300. The system sets up a standard target value 16.5 dBm, a difference is obtained when comparing with the measured value and the target value and the difference is a compensated value 0.5 dBm. The present transformation formula uses a compensation step (e.g., 0.25 dBm) set by the system and a compensation index corresponding to the compensated value 0.5 dBm can be calculated, i.e., 2, as when 0.5 divided by 0.25 equals 2. Accordingly, the compensation index 2 is the value to be written into the memory 313 of the wireless communication module 300.

TABLE 1

| Item (unit: dBm) | Measured value | target value | Compensation value | compensation index |
|---|---|---|---|---|
| Power calibration | 16 | 16.5 | 0.5 | 2 |

Afterwards, in the method for generating power-compensation values with historical data association, the computing circuit 307 uses the historical data 303 that implicates the associations among the power-compensation values applied to the wireless communication module in different frequencies to obtain data features. The associations among the power-compensation values are referred to for determining a range of critical compensation indexes, and by which a set of power-compensation values or power-compensation indexes applied to every individual wireless communication module or the similar product in multiple frequencies can be obtained. A power-compensation list 305 applied to the wireless communication modules in the same project is formed. The power-compensation list 305 records the power-compensation value or the power-compensation index applied to each of the wireless communication modules in the same project in each of the frequencies. For example, a set of power-compensation indexes applied to each of the wireless communication modules are formed.

After that, the set of power-compensation values or the power-compensation indexes in the power-compensation list 305 are written to the memory 313 of the wireless communication module 300 via a connection interface. The memory 313 can be a one-time programmable (OTP) memory such as an electrically-erasable programmable read-only memory (EEPROM) or an EFuse.

According to certain embodiments of the method for generating power-compensation values with historical data association of the present disclosure, the method can be performed by a computer system. The data operated in the computer system can be the compensation data provided by the manufacturer when shipping the communication circuits (e.g., WiFi™ SOC or Bluetooth™ chip) of the wireless communication modules. When the computer system obtains the compensation data, the historical data is established and can be used to obtain the associations of the power-compensation values applied to the wireless communication modules in different frequencies. The power-compensation values are then written to the memory of the wireless communication module by the computer system.

Figure 4:
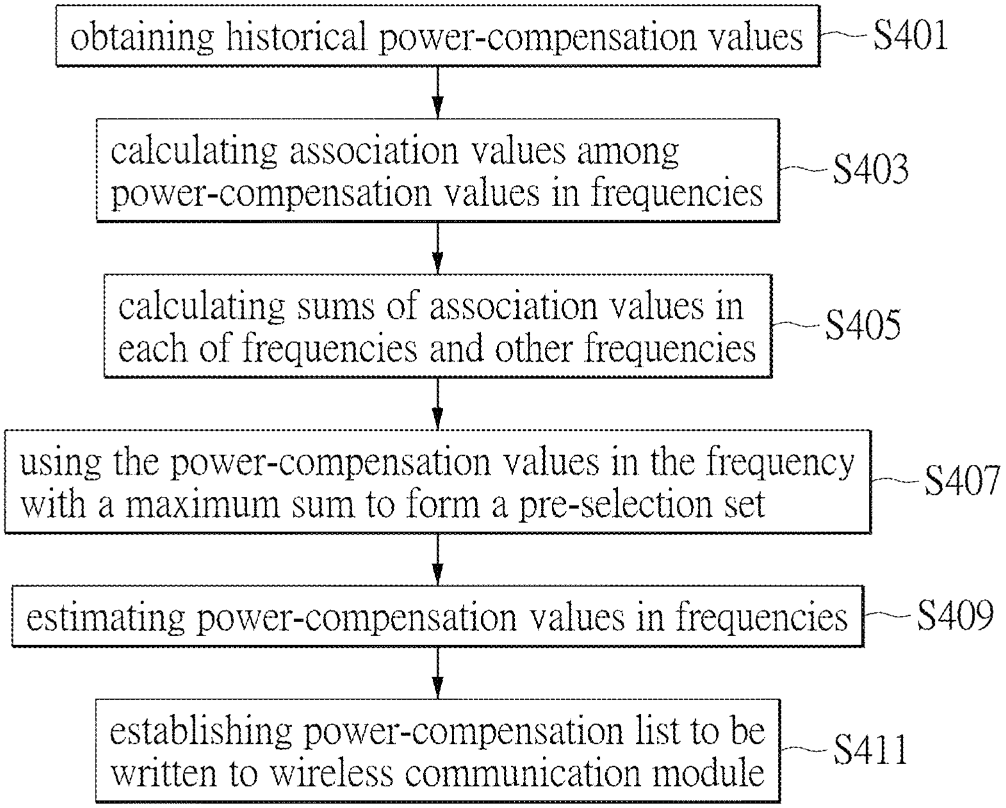
FIG. 4 is a flowchart illustrating a method for generating power-compensation values with historical data association according to one embodiment of the present disclosure.

FIG. 4 is a flowchart illustrating the method for generating power-compensation values with historical data association according to one embodiment of the present disclosure, and various exemplary relationship tables that show the associations in different phases in FIG. 5 to FIG. 7 and FIG. 9 to FIG. 12 are also referred to. FIG. 5 to FIG. 7 and FIG. 9 to FIG. 12 exemplarily show the association values among the power-compensation values (or the power-compensation indexes) to be applied to the wireless communication modules in different frequencies. The association values are referred to for evaluating an association level among the power-compensation values. After that, the power-compensation values in the critical frequency that can be effectively used to evaluate the power-compensation values in other frequencies can be obtained.

The historical data of the power-compensation values applied to the wireless communication module in multiple frequencies can be obtained from the test data of the wireless communication modules. The power-compensation value can be transformed to a specific type of power-compensation indexes (step S401). The association can be presented by a specific association indicator that can be any statistical quantity such as a correlation coefficient, a first pass yield, a yield or a total number of good products. Next, any of the association indicators can be used to evaluate the associations among the power-compensation indexes in each of the frequencies and the power-compensation indexes in other frequencies. The association values of the power-compensation indexes in the multiple frequencies can be obtained (step S403). A table can therefore be established. For example, a statistical quantity such as the correlation coefficient that can be calculated by a correlation coefficient formula can be used as an association indicator to indicate the association. One of the aspects of the correlation coefficient formula can adopt Pearson's correlation for calculating the correlation coefficients among the power-compensation values in the multiple frequencies. Thus, the correlation coefficients among the power-compensation values in the multiple frequencies are used to establish a correlation coefficient relationship table. Reference is made to FIG. 5, which shows an exemplary relationship table 50 recording correlation coefficients among the power-compensation values for the wireless communication module in the multiple frequencies. The relationship table 50 shows the association level between any two values.

Both a horizontal direction and a vertical direction of the relationship table 50 label the frequencies (e.g., frequency 1, frequency 2, frequency 3, . . . , frequency N−1 and frequency N) in which the wireless communication module operates. The values shown in the relationship table 50 are correlation coefficients among the power-compensation values in each of the frequencies and the power-compensation values in the multiple frequencies, including the correlation coefficient of "1.00" between the values in each frequency and itself. The correlation coefficient is "1.00" between the power-compensation values in the same frequency.

Next, the correlation coefficients of the power-compensation values in the multiple frequencies recorded in the relationship table 50 shown in FIG. 5 is referred to for determining association levels among the power-compensation values in different frequencies. Further reference is made to FIG. 6 showing a relationship table 60 that is used to evaluate the associations. It should be noted that the diagrams only show part of the contents but do not show a whole state of the wireless communication module.

Next, a sum of multiple association values among the power-compensation values in each of the frequencies and the power-compensation values in the multiple frequencies that the wireless communication module operates is calculated (step S405). For example, as shown in FIG. 6, the relationship table 60 includes a sum field 601, which is filled with multiple first sums and each of the first sums is a sum of association values of each of frequencies with respect to the multiple frequencies. In a first aspect, the first sum is such as a sum of the multiple correlation coefficients with respect to the multiple frequencies, and the sum can be used to evaluate an overall association of the power-compensation values in each frequency to the other frequencies.

After that, according to the overall association of the power-compensation values in each frequency to the other frequencies shown in the relationship table 60, a maximum can be selected from multiple first sums of the multiple association values (e.g., the first sums of statistical quantities). In one of the embodiments of the present disclosure, a maximum of the sums of the correlation coefficients is selected, and a first critical frequency corresponding to the maximum can be obtained. Reference is made to FIG. 7, which shows a relationship table 70 used to evaluate the association, and a first pre-selection set 701 shown in the relationship table 70 is formed (step S407). The first pre-selection set 701 includes the correlation coefficients in multiple frequencies corresponding to the first critical frequency.

Under the premise that the wireless communication modules in a same manufacturing project have similar data features, based on the association values between the power-compensation values in the first critical frequency (e.g., the frequency of "N−1") recorded in the first pre-selection set 701 and the power-compensation values in all of the frequencies, and the sum (e.g., the first sum) of the association values is the maximum, the power-compensation values in the first critical frequency and the power-compensation values in the other frequencies have a highest association. Therefore, the system adopts the power-compensation values in the first critical frequency, with reference to association values among the compensation value in the multiple frequencies (including the first critical frequency), so as to estimate the power-compensation values in other frequencies. The estimated power-compensation values are adapted to the other wireless communication modules in the same project. Thus, in one aspect, the power-compensation values in the other frequencies can be estimated based on the power-compensation values (or the power-compensation indexes) in the frequency "N−1" in the first pre-selection set 701 and the association values in the other frequencies (step S409). Accordingly, the power-compensation list to be written to the wireless communication module can be established by referring to the associations of the historical data. The power-compensation list records a set of power-compensation values corresponding to each of the frequencies that the wireless communication module operates and the power-compensation list is configured to be written to the memory of the wireless communication module (step S411).

According to the exemplary example shown in FIG. 7, in the relationship table 70 used to evaluate the associations, with the correlation coefficient as an example, the correlation coefficients of the power-compensation values in the frequency "N−1" with a sum 705 having the largest sum of correlation coefficients and the power-compensation values in other frequencies form the first pre-selection set 701. The power-compensation values in the frequency "N−1" that becomes the first critical frequency can be used to estimate the power-compensation values in other frequencies.

Figure 8:
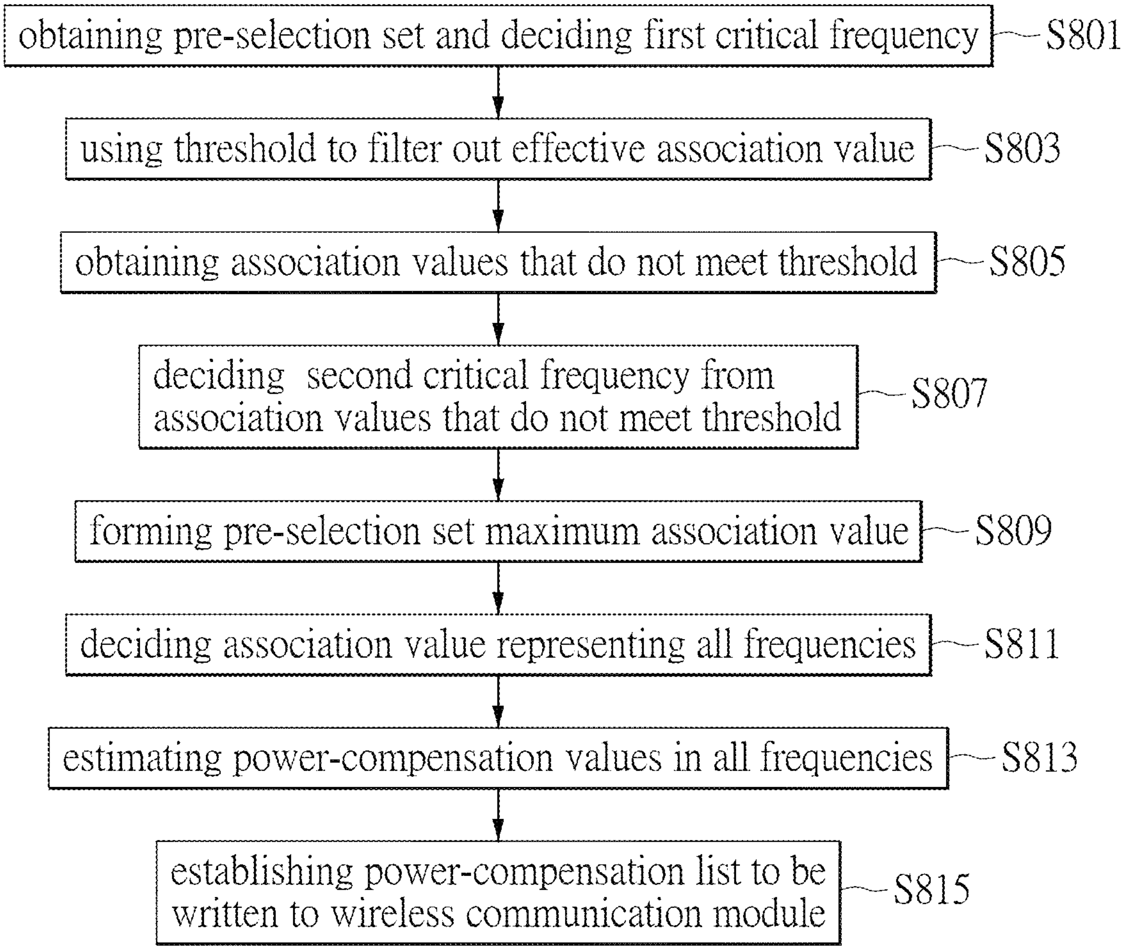
FIG. 8 is another flowchart illustrating the method for generating power-compensation values with historical data association according to another embodiment of the present disclosure.

Further reference is made to FIG. 8, which is a flowchart illustrating a subsequent flow after performing the method for generating power-compensation values with historical data association according to one embodiment of the present disclosure. After the first pre-selection set 701 is obtained (step S801), the association values are also required to be verified so as to determine whether or not the power-compensation values in all of the frequencies can be effectively estimated since the first pre-selection set 701 may still contain the power-compensation values with a lower association value. In one of the embodiments of the present disclosure, the system can accordingly preset a threshold to filter out (step S803) the association values in the first critical frequency (e.g., the frequency "N−1") from the first pre-selection set 701 and obtain the one or more association values that do not reach the threshold in other frequencies (step S805). After that, a reduced relationship table can then be obtained, and the flow shown in FIG. 4 is repeated for determining a second critical frequency for the power-compensation values with the association values that do not reach the threshold. Again, a new pre-selection set is determined, for example, a second pre-selection set 901 shown in FIG. 9 is obtained (step S807). Accordingly, the further pre-selection sets (e.g., the first pre-selection set 701' and the second pre-selection set 901) with respect to the frequencies having the corresponding association values that do not reach the threshold can be obtained through many times of determination by selecting the maximum of the association values. Therefore, the new pre-selection set with the maximum association value is formed (step S809).

In the above steps S805 to S809, if the pre-selection set contains one or more association values of the power-compensation values that do not reach the threshold, the flow shown in FIG. 8 can be repeated for these one or more association values to obtain one or more corresponding frequencies. Similarly, another sum (i.e., a second sum) of the association values between the power-compensation values in one or more frequencies and the power-compensation values in all of the frequencies is calculated. A maximum of the second sums can be used to determine a new critical frequency (e.g., the critical frequency) so as to obtain a new pre-selection set (e.g., the second pre-selection set). After that, a maximum association value from the new pre-selection set is determined. After repeating the above-described flow, the association values for all of the frequencies that the wireless communication module operates can be obtained (step S811). The power-compensation values or the power-compensation indexes for all of the frequencies can be estimated based on the associations (step S813). The power-compensation values are referred to for establishing a power-compensation list to be written to the memory of the wireless communication module (step S815).

The above-mentioned threshold is such as the target value of association set by the system. Taking the correlation coefficient as an example, the target value can be set as a correlation coefficient of "0.92." In order to achieve a target of a first pass yield (FPY) when verifying the wireless communication module, all of the target values of the correlation coefficients are referred to for filtering out the correlation coefficients of the power-compensation values in the critical frequency that can effectively evaluate other power-compensation values.

Therefore, one or more frequencies corresponding to the association values that do not reach the threshold of association (e.g., the threshold for the correlation coefficient is set to 0.92) can be obtained. According to the exemplary example shown in the diagram, the correlation coefficients that do not reach the threshold of correlation coefficient (e.g., 0.92) are as shown in FIG. 7. As shown in FIG. 7, the correlation coefficient 703 (i.e., the correlation coefficient of the first critical frequency is "0.91") that does not meet the target value is the correlation coefficient lower than "0.92" in frequency 2 (f2). The frequencies of one or more correlation coefficients that do not meet the target value are reduced to be a relationship table 90 shown in FIG. 9.

According to the exemplary example of the relationship table 90 shown in FIG. 9, the relationship table 90 is used to evaluate associations of the power-compensation indexes applied to the wireless communication module in the multiple frequencies. The exemplary relationship table includes the correlation coefficients that also contain the correlation coefficients of the frequencies not shown in FIG. 5, FIG. 6 and FIG. 7. The exemplary relationship table shown in FIG. 9 is reduced to obtain a first pre-selection set 701' which contains the correlation coefficients (e.g., 0.91, 0.91, 0.91 and 0.89) that do not meet the target value in frequency 2 (f2), frequency 10 (f10), frequency 11 (f11) and frequency 13 (f13) corresponding to frequency "N−1." Correlation coefficient sums 905 are calculated based on the reduced relationship table 90.

Similarly, the above-mentioned reduced relationship table 90 that is used to evaluate the associations exemplarily lists the correlation coefficients among the power-compensation values for the wireless communication module in multiple frequencies such as frequency 2 (f2), frequency 10 (f10), frequency 11 (f11) and frequency 13 (f13). New correlation coefficient sums 905 of the correlation coefficients that do not meet the target value respectively in the above-mentioned frequency 2 (f2), frequency 10 (f10), frequency 11 (f11) and frequency 13 (f13) of the first pre-selection set 701 are again calculated. Next, a maximum of the correlation coefficient sums 905 (e.g., 3.73) is determined and is used to determine a second critical frequency, for example the second critical frequency is frequency 10 according to the current example. Further, the correlation coefficient of the frequencies corresponding to the correlation coefficients that do not meet the target value in the second critical frequency and the above-described first pre-selection set form a second pre-selection set 901. As shown in the step S807 of FIG. 8, the association values that fail to reach the threshold are used to determine the second critical frequency.

Since the sum of the association values in the first critical frequency and the second critical frequency that are obtained at different stages by the above flow will be the maximum, the power-compensation values in both the first critical frequency and the second critical frequency can be used to estimate the power-compensation values in other frequencies, and accordingly the power-compensation list can be formed.

According to certain embodiments of the present disclosure, the reduced relationship table 90 includes the first pre-selection set 701' that can be determined by the flow of FIG. 4 and the second pre-selection set 901 that can be determined by the flow of FIG. 8. The largest correlation coefficients for frequency 2, frequency 10, frequency 11 and frequency 13 can be selected from the first pre-selection set 701' and the second pre-selection set 901 so as to form the largest correlation coefficient 903 in the first pre-selection set. As shown in the step S809 of FIG. 8, a maximum association value in the pre-selection set is formed. In the current example, the larger correlation coefficients in frequency 2, frequency 10, frequency 11 and frequency 13 (e.g., 0.91, 1.00, 0.97 and 0.92) for the wireless communication module are determined.

Next, the target value with respect to the correlation coefficient can also be a threshold for filtering out and obtaining the correlation coefficient 903 in the first pre-selection set. Taking the threshold 0.92 as an example, the target value for filtering out correlation coefficient is configured to be the correlation coefficient 0.91 of the power-compensation value between the frequency 2 and frequency N−1. Thus, the frequencies (can be one or more frequencies) that the correlation coefficients do not meet the target value can again be reduced, as shown in FIG. 10, where a relationship table 11 that is again reduced is shown for further evaluating the associations.

Only the correlation coefficients in frequency 2 do not meet the target value according to the relationship table 11 shown in FIG. 10, and accordingly another maximum of the correlation coefficients can be obtained, i.e., the correlation coefficient 1.00 of the frequency 2 on its own is the maximum and the correlation coefficient 1.00 forms a third pre-selection set 111, and simultaneously a third critical frequency (i.e., frequency 2) is also determined. The largest correlation coefficient 113 in the second pre-selection set 901 is obtained. The relationship table 11 shown in the figure still remains the correlation coefficients of the first pre-selection set 701" and the second pre-selection set 901'.

According to the above examples, FIG. 7 shows the first pre-selection set 701 that is firstly determined, and the effective correlation coefficients in the first critical frequency used to estimate the compensation values in other frequencies can be filtered out by the threshold. The correlation coefficients that do not reach the threshold in the other frequencies can be used to form the second pre-selection set 901 shown in FIG. 9 through the flow described in FIG. 8. The effective correlation coefficient that can be used to estimate the compensation values in other frequencies in the second critical frequency can also be filtered out through the threshold. However, there are still the correlation coefficients that do not reach the threshold in the second critical frequency. Therefore, the third pre-selection set 111 shown in FIG. 10 can be next determined from the correlation coefficients that do not reach the threshold. The third critical frequency can also be determined. Finally, the correlation coefficients that can effectively estimate the power-compensation values for the wireless communication module in all of the frequencies are obtained, as shown in FIG. 11.

A relationship table 12 shown in FIG. 11 shows a first critical frequency (corresponding to frequency N−1) 121, a second critical frequency (corresponding to frequency 10) 122 and a third critical frequency (corresponding to frequency 2) 123, and the correlation coefficients among the power-compensation values for all of the frequencies. A maximum of the correlation coefficients for each of the frequencies in the first critical frequency 121, the second critical frequency 122 and the third critical frequency 123 is obtained so as to obtain the largest correlation coefficients 125 that form a pre-selection set. The largest correlation coefficients 125 in the pre-selection set are used to estimate the power-compensation values for the wireless communication module in all of the frequencies.

According to the above-described embodiments, the power-compensation values in the three critical frequencies, with reference to the correlation coefficients (e.g., the larger correlation coefficients in the first pre-selection set, the second pre-selection set and the third pre-selection set) among the other frequencies, can be used to estimate the power-compensation values for the wireless communication module in all of the frequencies. Therefore, a power-compensation list adapted to the wireless communication module is finally established. The power-compensation list records the power-compensation values or the power-compensation indexes that are used to calibrate the power value for each of the frequencies.

The power-compensation values used to estimate the power-compensation values for the wireless communication module in all of the frequencies are obtained based on the historical data of the correlation coefficients shown in FIG. 5 among the multiples frequencies the wireless communication module operates. Nevertheless, the historical data that is obtained by actually testing the wireless communication modules can include more complex association indicators. For the products having a huge amount of historical data, the maximum association values used to form the power-compensation list in the pre-selection set can be obtained by regions.

Figure 12:
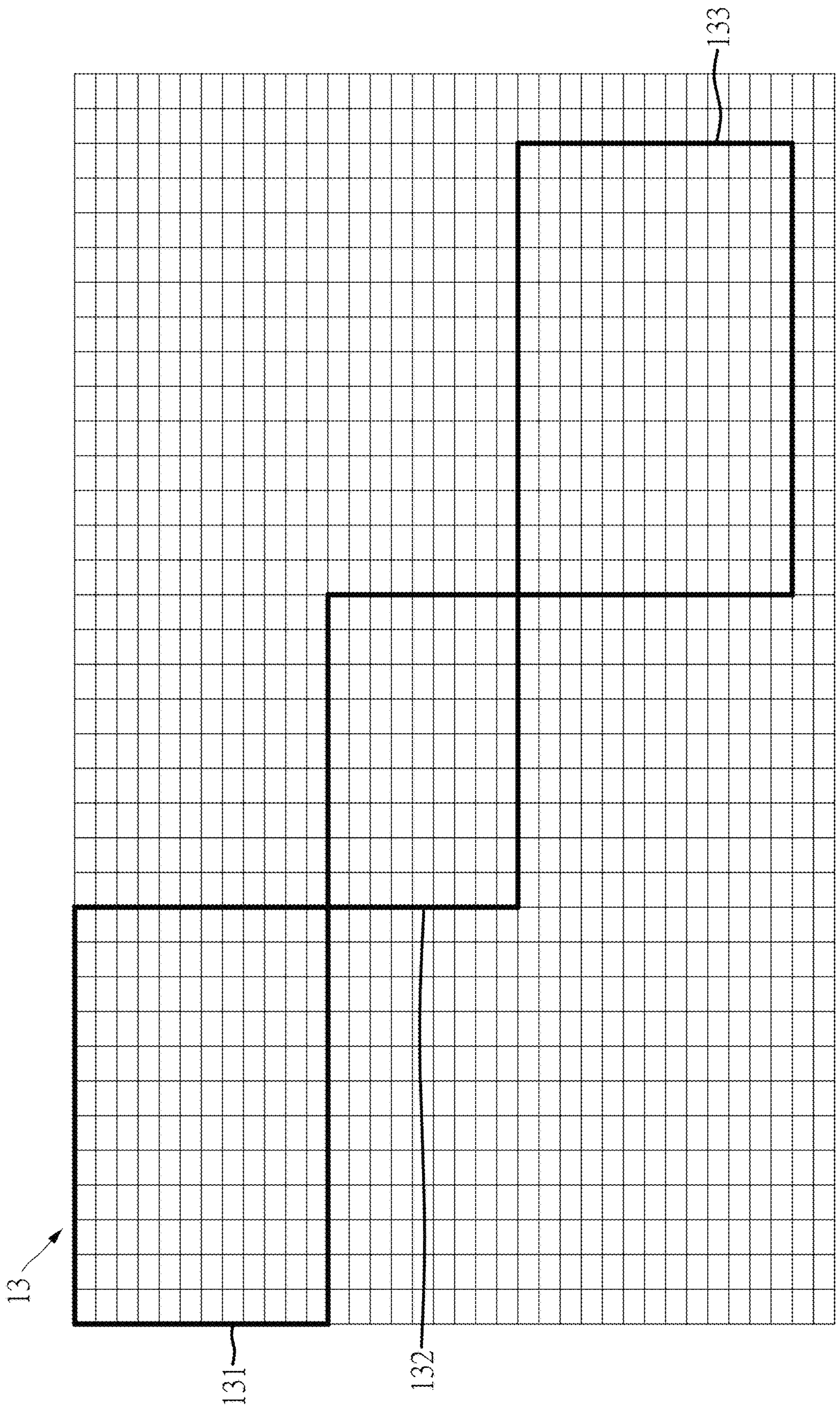
FIG. 12 is an exemplary example of a relationship table of correlation coefficients among power-compensation values for the wireless communication module in multiple frequencies.

With the correlation coefficient as an example, a relationship table 13 for the correlation coefficients shown in FIG. 12 lists the correlation coefficients among the power-compensation values applied to the wireless communication module in multiple frequencies. The frequencies are divided into multiple regions, e.g., a first region 131, a second region 132 and a third region 133. The historical data of the correlation coefficients in the regions are used to obtain the critical frequency including the power-compensation values with the highest or higher associations in multiple frequencies of each of the regions by the above-described method. After the correlation coefficients in all of the critical frequencies are combined, the power-compensation values for the wireless communication module in all of the frequencies can be estimated.

Figure 13:
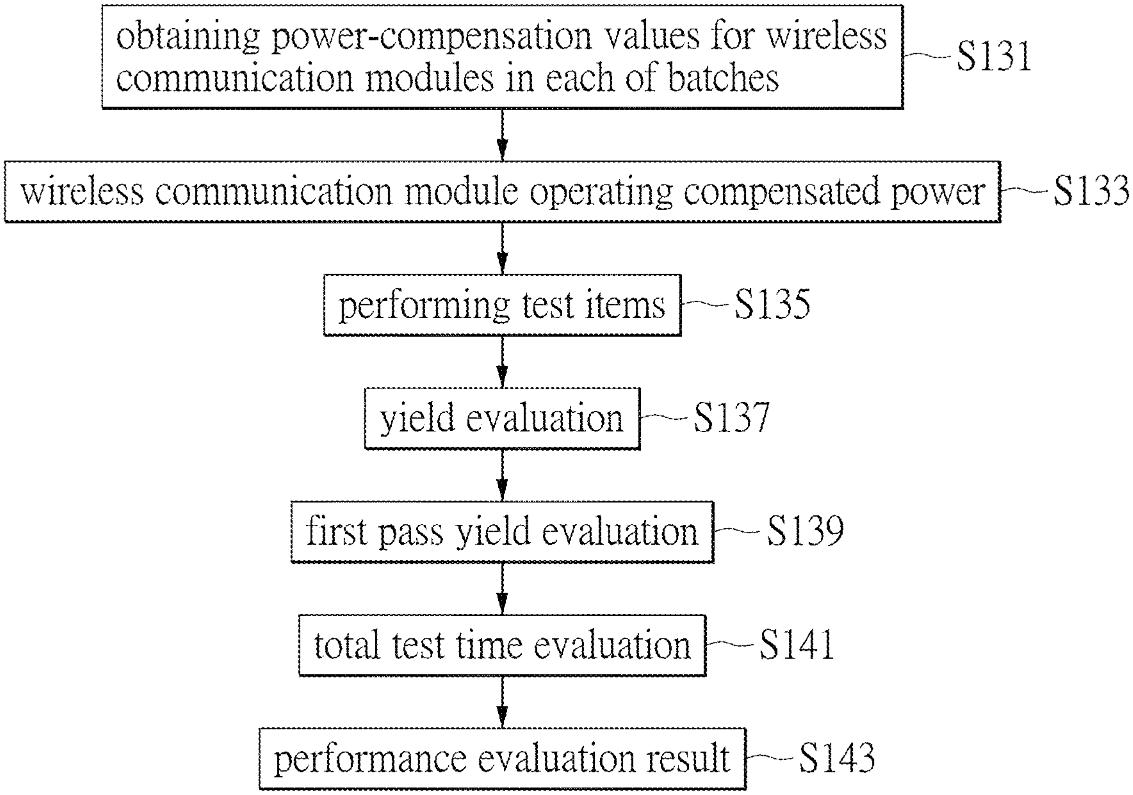
FIG. 13 is a flowchart illustrating a process of performance evaluation using the power-compensation values according to one embodiment of the present disclosure.

Further, reference is made to FIG. 13, which is a flowchart describing a process of using the power-compensation value to perform performance evaluation in one embodiment of the present disclosure. When the power-compensation values adapted to the wireless communication modules in every production batch are generated by the method for generating power-compensation values with historical data association (step S131), the wireless communication modules operate with the compensated power (step S133) and the operating performances of the wireless communication modules can be evaluated.

Multiple test items are executed on the wireless communication modules through a test platform (step S135). For example, output power, operating frequency bandwidths and product stability are measured when the wireless communication modules operate with the compensated power. The multiple test items are executed to determine whether or not the wireless communication modules pass the requirements of product specifications.

Next, the test results through the test items are referred to for evaluating the performances of the wireless communication modules, and the performance evaluation indicators are such as yield (step S137), which represents a proportion of the wireless communication modules passing one single test item of the product specification, a first pass yield (step S139), which represents a proportion of the wireless communication modules that pass all of the test items of the product specification at the first time, and a total test time (or cycle time) evaluation (step S141), which represents an improvement time of an average production time of the wireless communication modules. The improvement time can be obtained through comparison of between the average production times before and after the wireless communication modules applying the power compensation method illustrated in the above paragraphs. In addition, the improvement time can be obtained through the comparison of the average production times obtained by using the method illustrated in the above paragraphs and other methods.

Finally, performance evaluation of the wireless communication modules based on the evaluation indicators such as yield evaluation (e.g., the proportion of the products passing one single test item is configured to be larger than or equal to 90%), the first pass yield evaluation (e.g., the proportion of the products passing all of the test items at the first time is configured to be larger than or equal to 70%), and the total test time evaluation (e.g., the improvement time is configured to be shorter than or equal to 300 seconds) can be obtained (step S143).

In conclusion, according to the above embodiments of the method for generating power-compensation values with historical data association and the wireless communication module, based on a premise that the transmission data of the wireless communication modules in the same manufacturing project have a high association, the associations among the power-compensation values for the wireless communication modules in multiple frequencies can be obtained from the historical data, and critical frequencies with highest sums of association values are selected. The associations can be used to estimate the power-compensation values in all of the frequencies so as to establish a power-compensation list to be written into a memory of each of the wireless communication modules. The critical frequencies may be repeatedly determined if any of the power-compensation values fails to meet a target value, so that the power-compensation values for all of the frequencies can be obtained.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for generating power-compensation values with historical data association, performed in a computer system, the method comprising:

obtaining associations among power-compensation values that a wireless communication module operates in multiple frequencies;

calculating a first sum of multiple association values among power-compensation values between each of the multiple frequencies and the multiple frequencies, and obtaining multiple first sums correspondingly for the multiple frequencies;

obtaining a maximum from the multiple first sums and a first critical frequency corresponding to the maximum;

forming a first pre-selection set based on the multiple association values between the first critical frequency and the power-compensation values in the multiple frequencies; and estimating power-compensation values adapted to the multiple frequencies based on the power-compensation values of the first critical frequency and the association values in the multiple frequencies so as to form a power-compensation list.

2. The method according to claim 1, wherein, for one or more association values lower than a target value in the first pre-selection set, one or more second sums of the association values between the one or more power-compensation values corresponding to one or more frequencies and the power-compensation values of the multiple frequencies is calculated, and a maximum of the one or more second sums is obtained so as to obtain a second critical frequency correspondingly.

3. The method according to claim 2, wherein the association values among the power-compensation values in one or more frequencies corresponding to the one or more association values that does not meet the target value in the second critical frequency and the first pre-selection set form a second pre-selection set.

4. The method according to claim 2, wherein power-compensation values adapted to all frequencies are estimated according to the power-compensation values in the first critical frequency and the second critical frequency and with reference to the association values in the first pre-selection set and a second pre-selection set.

5. The method according to claim 1, wherein a correlation coefficient is used as an association indicator to indicate the association, and the wireless communication module is under test through a test platform so as to measure transmit power of the wireless communication module under various configuration settings of antenna-datarate-frequency, and the measured transmit power is compared with target values corresponding to the configuration settings of antenna-datarate-frequency so as to obtain multiple power-compensation values that form the historical data; and wherein a correlation coefficient formula is used to calculate the correlation coefficient between the power-compensation value in each of the frequencies and the power-compensation value in other frequencies.

6. The method according to claim 5, wherein, for one or more association values lower than a target value in the first pre-selection set, one or more second sums of the association values between the one or more power-compensation values corresponding to one or more frequencies and the power-compensation values of the multiple frequencies is calculated, and a maximum of the one or more second sums is obtained so as to obtain a second critical frequency correspondingly.

7. The method according to claim 1, wherein the associations among the power-compensation values in the multiple frequencies are used to establish a relationship table that records the association values between the power-compensation value in each of the frequencies and the power-compensation value in the multiple frequencies.

8. The method according to claim 7, wherein, for one or more association values lower than a target value in the first pre-selection set, one or more second sums of the association values between the one or more power-compensation values corresponding to one or more frequencies and the power-compensation values of the multiple frequencies is calculated, and a maximum of the one or more second sums is obtained so as to obtain a second critical frequency correspondingly.

9. The method according to claim 8, wherein the association values among the power-compensation values in one or more frequencies corresponding to the one or more association values that does not meet the target value in the second critical frequency and the first pre-selection set form a second pre-selection set.

10. The method according to claim 8, wherein power-compensation values adapted to all frequencies are estimated according to the power-compensation values in the first critical frequency and the second critical frequency and with reference to the association values in the first pre-selection set and a second pre-selection set.

11. A wireless communication module, comprising:

a wireless communication circuit issuing wireless RF signals with a transmit power via an antenna; and a memory electrically connected with the wireless communication circuit, and storing a set of power-compensation values being obtained using historical data for the wireless communication module in multiple frequencies, wherein the set of power-compensation values are obtained by steps comprising:

obtaining associations among power-compensation values that a wireless communication module operates in multiple frequencies;

calculating a first sum of multiple association values among power-compensation values between each of the multiple frequencies and the multiple frequencies, and obtaining multiple first sums correspondingly for the multiple frequencies;

obtaining a maximum from the multiple first sums and a first critical frequency corresponding to the maximum;

forming a first pre-selection set based on the multiple association values between the first critical frequency and the power-compensation values in the multiple frequencies; and estimating power-compensation values adapted to the multiple frequencies based on the power-compensation values of the first critical frequency and the association values in the multiple frequencies so as to form a power-compensation list to be stored to the memory.

12. The wireless communication module according to claim 11, wherein, in the step of obtaining the set of power-compensation values, for one or more association values lower than a target value in the first pre-selection set, one or more second sums of the association values between the one or more power-compensation values corresponding to one or more frequencies and the power-compensation values of the multiple frequencies is calculated, and a maximum of the one or more second sums is obtained so as to obtain a second critical frequency correspondingly.

13. The wireless communication module according to claim 11, wherein a correlation coefficient is used as an association indicator to indicate the association, and the wireless communication module is under test through a test platform so as to measure transmit power of the wireless communication module under various configuration settings of antenna-datarate-frequency, and the measured transmit power is compared with target values corresponding to the configuration settings of antenna-datarate-frequency so as to obtain multiple power-compensation values that form the historical data; and wherein a correlation coefficient formula is used to calculate the correlation coefficient between the power-compensation value in each of the frequencies and the power-compensation value in other frequencies.

14. The wireless communication module according to claim 13, wherein, in the step of obtaining the set of power-compensation values, for one or more association values lower than a target value in the first pre-selection set, one or more second sums of the association values between the one or more power-compensation values corresponding to one or more frequencies and the power-compensation values of the multiple frequencies is calculated, and a maximum of the one or more second sums is obtained so as to obtain a second critical frequency correspondingly.

15. The wireless communication module according to claim 14, wherein the association values among the power-compensation values in one or more frequencies corresponding to the one or more association values that does not meet the target value in the second critical frequency and the first pre-selection set form a second pre-selection set; and power-compensation values adapted to all frequencies are estimated according to the power-compensation values in the first critical frequency and the second critical frequency and with reference to the association values in the first pre-selection set and the second pre-selection set.

* * * * *